US007347310B2

(12) United States Patent
Tanaka et al.

(10) Patent No.: US 7,347,310 B2
(45) Date of Patent: Mar. 25, 2008

(54) APPARATUS FOR VALIDATING AND PAYING OUT COINS

(75) Inventors: Hideo Tanaka, Saitama-ken (JP); Ryoji Yamagishi, Saitama-ken (JP)

(73) Assignee: Nippon Conlux Co., Ltd. (JP)

( * ) Notice: Subject to any disclaimer, the term of this patent is extended or adjusted under 35 U.S.C. 154(b) by 0 days.

(21) Appl. No.: 11/533,088

(22) Filed: Sep. 19, 2006

(65) Prior Publication Data

US 2007/0068767 A1 Mar. 29, 2007

(30) Foreign Application Priority Data

Sep. 26, 2005 (JP) ............................ 2005-278121

(51) Int. Cl.
*G07F 9/10* (2006.01)
*H02N 11/00* (2006.01)

(52) U.S. Cl. ........................................ 194/350; 310/10

(58) Field of Classification Search ................. 194/350
See application file for complete search history.

(56) References Cited

U.S. PATENT DOCUMENTS 5,591,013 A * 1/1997 Kawafune et al. .......... 417/271
5,616,075 A * 4/1997 Winstanley et al. .......... 453/41
6,637,578 B1 * 10/2003 Ono et al. .................. 194/346
6,929,110 B2 * 8/2005 Dobbins et al. ............ 194/334

* cited by examiner

*Primary Examiner*—Patrick Mackey
*Assistant Examiner*—Mark J. Beauchaine
(74) *Attorney, Agent, or Firm*—Fish & Richardson P.C.

(57) ABSTRACT

The object of the present invention is to provide apparatus for validating and paying out coins, which can guide metal fragments to the surface of the driving motor such that the guided metal fragments are attracted to the surface of the driving motor so as to prevent the metal fragments from entering the coin pay-out mechanism, thereby to prevent the coin pay-out mechanism from erroneously operating, and which can reduce the labor of the maintenance such as cleaning by accumulating the metal fragments at a given place.

The apparatus of the present invention for validating and paying out coins comprises comprising a coin inspecting section for validating coins dropped into a coin slot, a coin sorting section for guiding the dropped coins either to a current coin channel or to a fake coin channel on the basis of determination of the coin inspecting section as to whether the dropped coins are current coins or fake coins, a coin container section for receiving coins categorized in their denominations so as to store the categorized coin for each denomination, and a coin pay-out mechanism for paying out, as required, coins as change from the coins stored in the coin container section, wherein a driving motor for driving the coin pay-out mechanism is located above the coin pay-out mechanism, one or more guidepaths are mounted at a slant so as to guide extraneous objects to the surface of the driving motor, and the guided extraneous objects are attracted to the surface of the driving motor by magnetic field induced by a permanent magnet in the driving motor.

2 Claims, 6 Drawing Sheets

100

APPARATUS FOR VALIDATING AND PAYING OUT COINS

BACKGROUND OF THE INVENTION

1. Field of the Invention

The present invention relates to an apparatus for validating and paying out coins.

2. Description of the Related Art

An apparatus for validating and paying out coins is known that is arranged in service equipment such as an automatic vending machine, change machine, etc. for validating dropped coins, sorting and storing coins determined as current coins by the denomination and paying out, as required, coins corresponding to an amount of change from the stored coins. Japanese Patent Application Laid-Open No. H11-161825, for example, handles a mechanism for paying out coins of an apparatus for validating and paying out coins as above. The above coin pay-out mechanism comprises a pair of pay-out cams driven by a single driving motor through driving force transmitting means such as a gear and rotating in one direction per pay-out operation, a pay-out link reciprocating from an initial position by engagement with a projecting portion on a lower surface of the pay-out cam when the pay-out cam is rotated in one direction, a pay-out slide detachably mounted to the pay-out link and reciprocating together with the pay-out link, and a solenoid actuator controlling operation of a slide member so that the slide member selectively closes a slit for paying out coins formed in the pay-out slide by vertically moving a control lever.

Recently, with the purpose of protecting automatic vending machines installed outside from crimes, a user of the automatic vending machine might mount an antitheft device in close proximity to a coin slot of the automatic vending machine. At mounting of the antitheft device, a hole for a bolt or screwing is opened on the outer surface close to the coin slot of the automatic vending machine, but extraneous objects generated at that time (mainly metal fragments or chips) might enter the apparatus for validating and paying out coins mounted inside the automatic vending machine and adhere to the coin pay-out mechanism, particularly to the vicinity of the solenoid actuator, which causes a problem of malfunction of the coin pay-out mechanism.

[Patent Document] Japanese Patent Application Laid-Open Gazette No. H11-161825

SUMMARY OF THE INVENTION

In view of the above problem, the present invention has an object to provide an apparatus for validating and pay-out coins which can guide metal fragments, which are extraneous objects having entered the apparatus for validating and paying out coins, to the surface of a driving motor such that the guided metal fragments are attracted to the surface of the driving motor so as to prevent the metal fragments from entering the coin pay-out mechanism, thereby to prevent the coin pay-out mechanism from erroneously operating, and which can reduce the labor of the maintenance such as cleaning by accumulating the metal fragments at a given place.

The apparatus for validating and paying out coins according to the present invention comprises a coin inspecting section for validating dropped coins, a coin sorting section for guiding the dropped coins either to a current coin channel or to a fake coin channel on the basis of determination of said coin inspecting section as to whether the dropped coins are current coins or fake coins, a coin container section for storing current coins categorized in their denominations, and a coin pay-out mechanism for paying out, as required, coins as change from the coins stored in the coin container section, in which a driving motor for driving the coin pay-out mechanism is located above the coin pay-out mechanism, an inclined guide path is mounted so as to guide extraneous objects to the surface of the driving motor, and the guided extraneous objects are attracted to the driving motor.

Further features of the present invention will become apparent from the following description of exemplary embodiments (with reference to the attached drawings).

DESCRIPTION OF THE EMBODIMENTS

Figure 1:
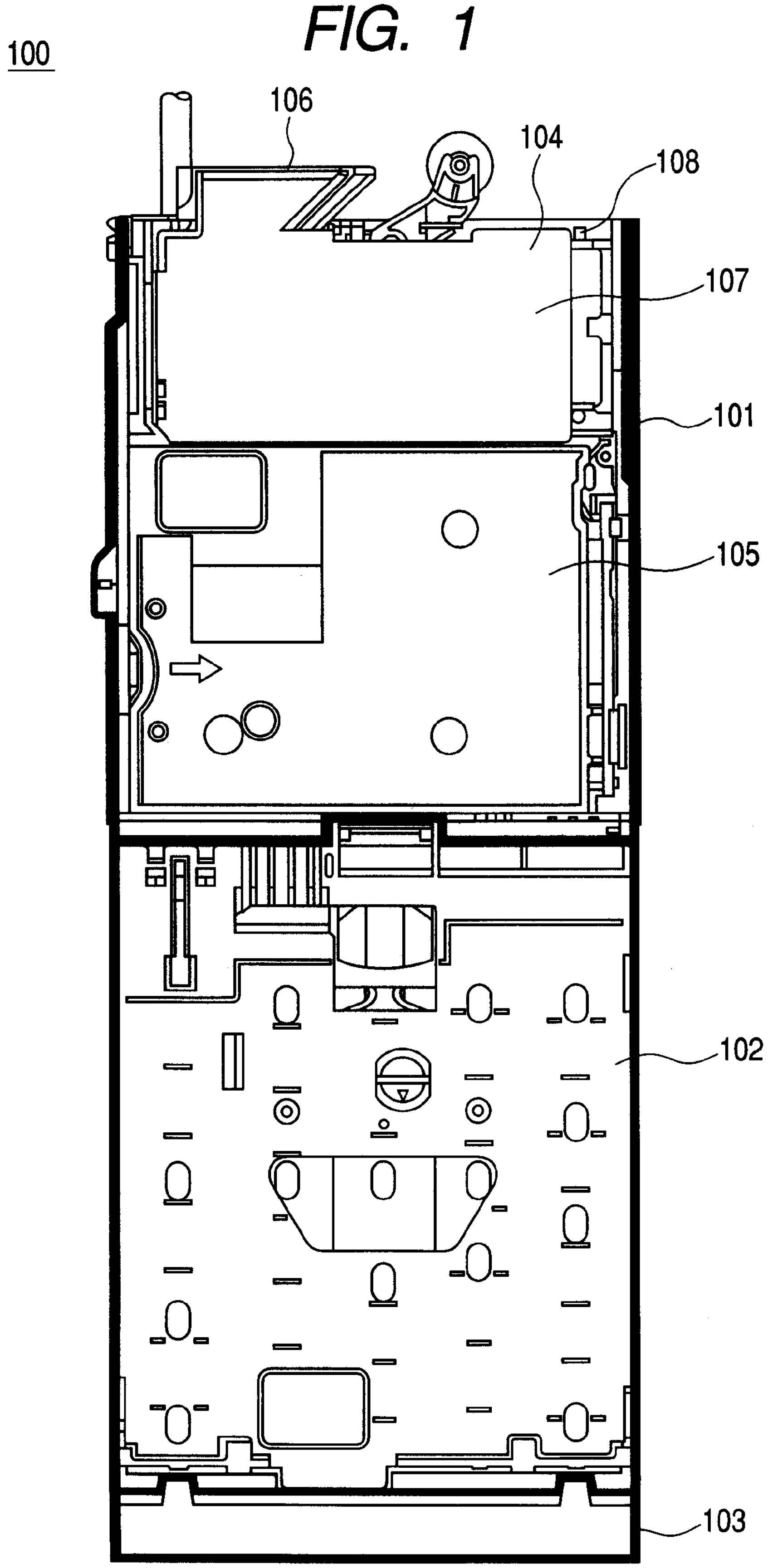
FIG. 1 is a view showing an appearance of an apparatus for validating and paying out coins.

FIG. 1 is a view showing an appearance of an apparatus for validating and paying out coins 100. The apparatus for validating and paying out coins 100 comprises a coin validating section 101, a coin container section 102, and a coin pay-out section 103. The coin validating section 101 includes a coin inspecting section 104 for validating dropped coins and a coin sorting section 105 for sorting, for each denomination, the coins determined as current coins. The coin container section 102 is mounted below the coin sorting section 105, and comprises a plurality of coin tubes for storing, for each denomination, the coins which the coin sorting section 105 has sorted for each denomination. The coin pay-out section 103 pays out coins corresponding to the amount of change from one or more coin tubes which store the coins corresponding to the amount of change and are selected among the plurality of coin tubes of the coin container section 102.

On the upper surface of the coin inspecting section 104, a coin slot 106 is formed, and a coin passage is provided for guiding coins inputted through the coin slot 106 to the coin inspecting section 104 and the coin sorting section 105. The coin inspecting section 104 is further provided with a lid member 107 axially connected by a shaft 108 so that it is capable of rotational movement to the front side when seen from the front face. The lid member 107 is urged by a spring wound around the shaft 108 and applying a restoring force so that it is closed in the normal state.

Figure 2:
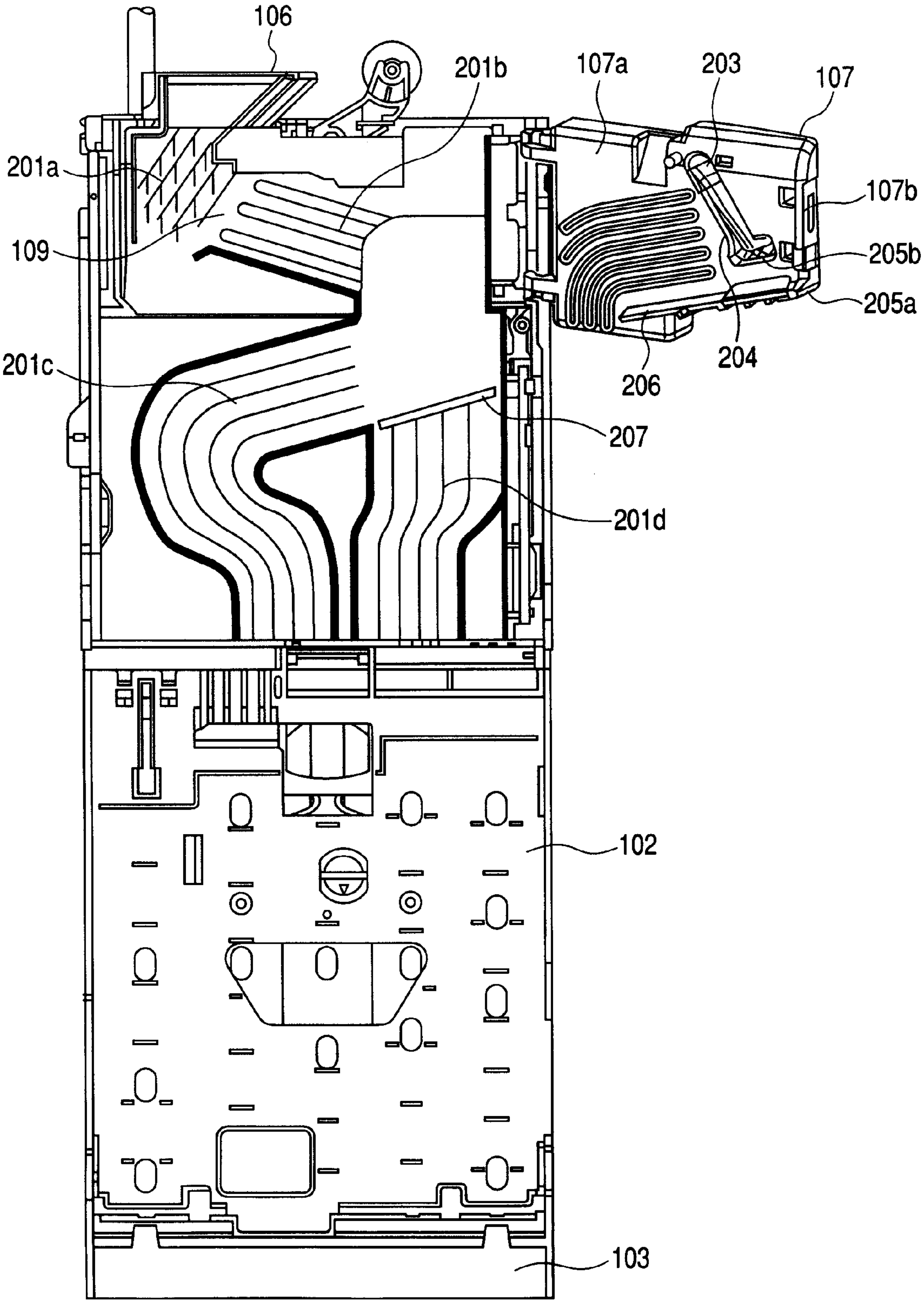
FIG. 2 is a view showing the appearance of an apparatus for validating and paying out coins in the state where a front cover of a coin sorting section of the apparatus for validating and paying out coins shown in FIG. 1 is removed and a lid member forming a front face of a coin identifying section is opened.

FIG. 2 shows the apparatus for validating and paying out coins 100 in the state where a front cover of the coin sorting section 105 of the apparatus for validating and paying out coins 100 shown in FIG. 1 is removed and the lid member 107 forming the front surface of the coin inspecting section 104 is opened. The coin passage includes a coin dropping passage 201*a* connected to the coin slot 106 and a coin inspecting passage 201*b* so that the coins passes the front face of a sensor coil arranged inside the lid member between the front face of the lid member 107 and a back face 107*a* of the lid member 107 for guiding coins determined as fake coins to a coin return slot. The coin passage further includes coin guiding passages 201*c* and 201*d* for guiding coins determined as current coins to the coin container section 102.

The coin dropping passage 201*a* and the coin inspecting passage 201*b* of the coin inspecting section 104 are defined by the back face 107*a* of the lid member 107 and a surface 109 opposed to the back face 107*a*. Below the coin slot 106, the coin dropping passage 201*a* is formed substantially vertically and moreover, the coin inspecting passage 201*b* connected to the coin dropping passage 201*a* and having the bottom surface forming a downward slant toward the front face of the sensor coil is formed. The dropped coin is guided downward by the coin dropping passage 201*a*. On the back face 107*a* of the lid member defining one of side faces of the coin dropping passage 201*a*, a coin guiding member 203 for applying regularity to the flow of coins in the coin dropping passage 201*a* is disposed. The coins having reached the lower end of the coin dropping passage 201*a* inevitably arrive at a connection portion with the coin inspecting passage 201*b*. The coin dropping passage 201*a* and the coin inspecting passage 201*b* have the dimension suitable for the diameter and thickness of a coin with the largest size.

The coin having reached the lower end of the coin dropping passage 201*a* reaches a connection portion with the coin inspection passage 201*b*. At the connection portion between the coin dropping passage 201*a* and the coin inspecting passage 201*b*, coin attitude stabilizing means 205 is disposed so as to operate to stabilize the attitude of coins. That is, the coin attitude stabilizing means 205 stabilizes the attitude of coins and allows the coins to go through a predetermined course while keeping the attitude. The coin whose attitude and course are controlled by the coin attitude stabilizing means 205 is moved on a slant surface 206 defining the bottom surface of the coin inspecting passage 201*b* while rotating and passes through the sensor coils forming a pair having the coin inspecting passage 201*b* between them. When the sensor coils determine true or fake of the dropped coin, a current coin is guided to the coin storing means provided with the coin tube of the coin storing section 102 through the coin guiding passages 201*c* and 201*d*, while a fake coin is guided to a return slot, not shown.

Figure 3A:
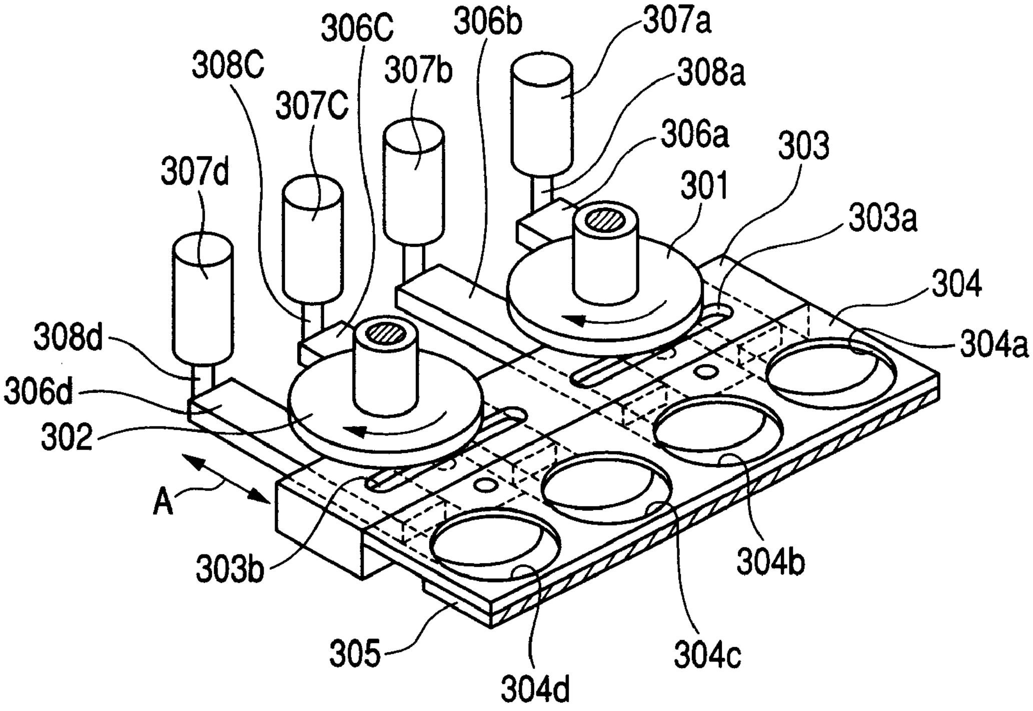
FIG. 3A is a view for explaining structure and operation of a coin pay-out mechanism disposed under a coin tube.
Figure 3B:
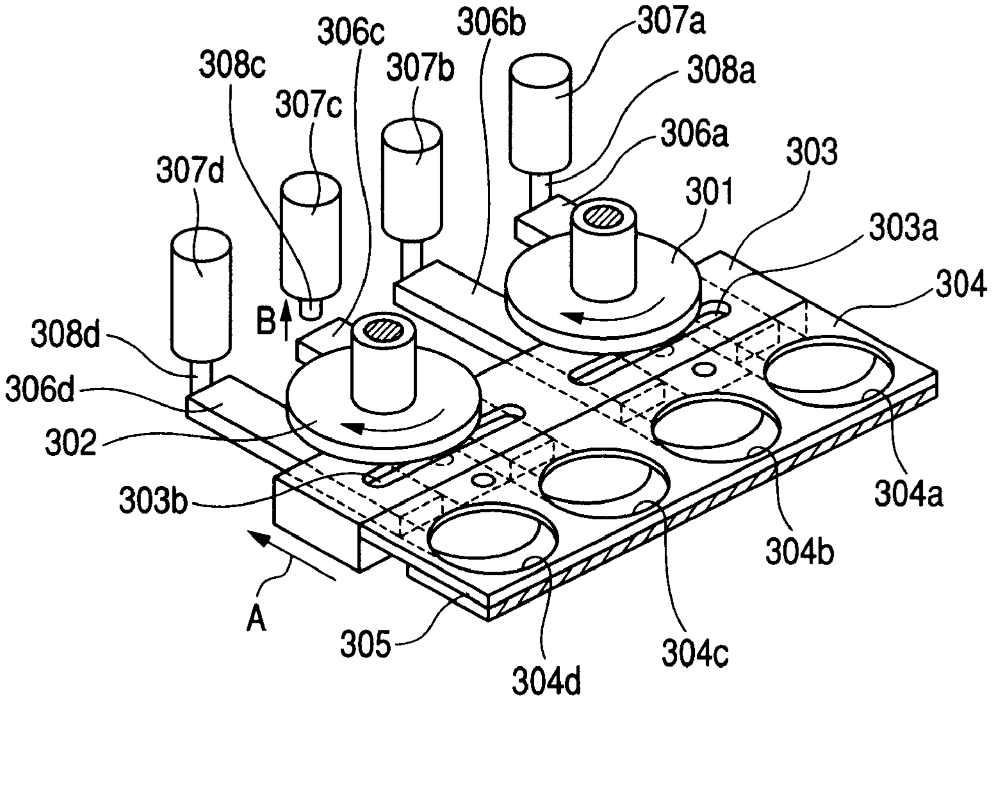
FIG. 3B is a view for explaining structure and operation of a coin pay-out mechanism disposed under a coin tube.
Figure 3C:
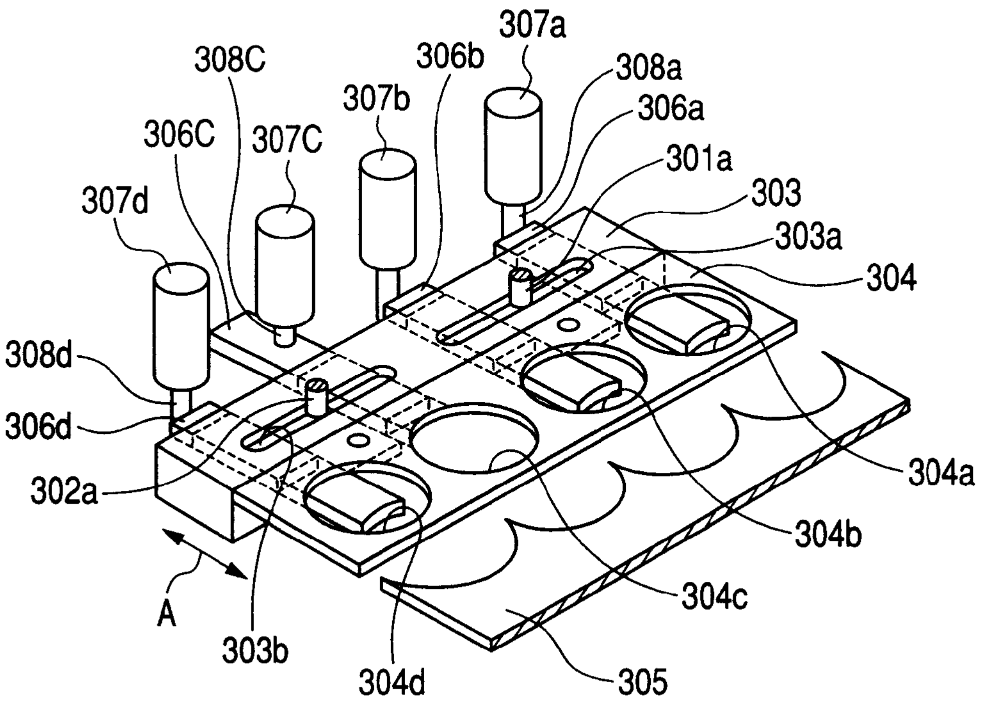
FIG. 3C is a view for explaining structure and operation of a coin pay-out mechanism disposed under a coin tube.

The coins accumulated in the coin container section 102 are used for returning changes to a customer. The coins are accumulated in the plurality of coin tubes constituting the coin storing means and extending in the vertical direction. The construction and operation of a coin pay-out mechanism 300 (pay-out slide type) will be described below in detail. FIGS. 3A to 3C are views for explaining the structure and operation of the coin pay-out mechanism 300 disposed below the coin tube. This coin pay-out mechanism 300 includes a pay-out cam driving means 402 comprising a driving motor 401, gear transmitting means for transmitting a driving force of the driving motor and the like and a pair of pay-out cams 301 and 302 which are rotated once per pay-out operation in a predetermined direction (either in the clockwise direction or the counter-clockwise direction) by application of the driving force by the pay-out cam driving means. From the respective bottom surfaces of the pair of pay-out cams 301 and 302, projection portions 301*a* and 302*a* located at positions displaced from the respective rotary shafts of the pay-out cams 301 and 302 only by a predetermined distance "a" and projecting vertically from the respective bottom surfaces are disposed. A pay-out link 303 has slits 303*a* and 303*b* engaged with the projection portions 301*a* and 302*a* projecting from the respective bottom surfaces of the pay-out cams 301 and 302, and it reciprocates a distance of 2*a* from the initial direction shown in FIG. 3A in the direction of an arrow A, when the pay-out cams 301 and 302 are rotated once in a predetermined direction. At a pay-out slide 304, a plurality of holes 304*a* to 304*d* are formed for storing only one coin stored at the respective lowermost ends of the coin tubes, not shown, constituting a coin storing device. The pay-out slide 304 is detachably engaged with the pay-out link 303 and slides coins at the lowermost end of the coin tube one by one from the bottom of the coin tube at paying-out operation through reciprocating motion in the arrow A direction of the pay-out link 4.

In the initial state shown in FIG. 3A, the holes 304*a* to 304*d* completely overlap the lowermost ends of the plural coin tubes, not shown. That is, the lowermost ends of the plural coin tubes, not shown, and the holes 304*a* to 304*d* communicate with each other, and a bottom plate 305 is disposed below the pay-out slide 304 for covering the bottom surface of the pay-out slide 304 at the initial position and preventing drop of the respective coins stored within the holes 304*a* to 304*d*. This bottom plate 305 constitutes the bottom surface of the plural coin tubes, not shown, constituting the coin storing section 102. In a plurality of holes located at a lower part of the pay-out link 303, slide members 306*a* to 306*d* are accommodated for controlling pay-out and non pay-out of each of the coins stored one by one in the holes 304*a* to 304*d* by positioning to block or by retreating to open the plural holes 304*a* to 304*d* sliding with the pay-out slide 304 at the pay-out operation. At the slide members 306*a* to 306*d*, stopper means, not shown, is disposed for restricting movement from the initial position shown in FIG. 3A to the pay-out link 303 side. Therefore, the slide members 306*a* to 306*d* are capable of moving to the side of solenoid actuators 307*a* to 307*d* with the reciprocating motion of the pay-out link 303 in the arrow A direction, but its movement from the initial position to the pay-out link 303 side is restricted.

When non pay-out is selected, it is so constituted that movement the respective rear ends of the respective slide members 306*a* to 306*d* are restricted by respective engagement with control levers 308*a* to 308*d* driven by each of the solenoid actuators 307*a* to 307*d* disposed individually at each of the slide members 306*a* to 306*d* such that the slide member 306*a* blocks the hole 304*a*, the slide member 306*b* blocks the hole 304*b*, the slide member 306*c* blocks the hole 304*c* and the slide member 306*d* blocks the hole 304*d*.

Here, referring to FIG. 3B, when a control device, not shown outputs a pay-out signal for paying out one coin stored in the hole 304*c*, the pay-out cam driving means rotates the pay-out cams 301 and 302 in the predetermined direction once based on the pay-out signal, causes the pay-out slide 304 to reciprocate in the arrow A direction and slides each of the coins accumulated at the lowermost ends of the plural coin tubes one by one in the arrow A direction by hooking it by each of the holes 304 to 304*d* of the pay-out slide 304. Immediately before sliding the pay-out slide 304 in the arrow A direction, based on the pay-out signal to pay out a single coin stored in the hole 304*c*, only a control lever 308*c* driven by the solenoid actuator 307*c* restricting the movement of the rear end of the slide member 306*c* is driven in the arrow B direction so that engagement between the control lever 308*c* and the rear end of the slide member 306*c* is disengaged. At this time, as shown in FIG. 3C, only the slide member 306*c* slides backward with the movement of the pay-out link 303 in the arrow A direction, maintains downward opening of the hole 304*c* and only the coins stored in the hole 304*c* are paid out. On the other hand, with regard to the other slide members 306*a*, 306*b* and 306*d*, the sliding motion of their rear ends is restricted by the control levers 308*a*, 308*b* and 308*d*, and while the pay-out link 303 slides in the arrow A direction, each of the slide members 306*a*, 306*b* and 306*d* does not slide but blocks the lower part of each of the corresponding holes 304*a*, 304*b* and 304*d*, and the bottom surface of each of the holes 304*a*, 304*b* and 304*d* is not released and the coins stored in each of the holes 304*a*, 304*b* and 304*d* are not paid out.

The description made relating to the above FIGS. 3A to 3C is for the case where the coin pay-out mechanism 300 is normally operated. As described in the related art, when a user of an automatic vending machine is to install antitheft equipment to the automatic vending machine installed outdoors, the user might form a hole for a bolt or a screw on the outer surface of the automatic vending machine, and that might cause metal fragments to enter the apparatus for validating and paying out coins mounted inside the automatic vending machine. If the fragments adheres or the like to the control lever driven by the solenoid actuator of the coin pay-out mechanism, there is a possibility that erroneous operation is caused in coin pay-out.

Figure 4A:
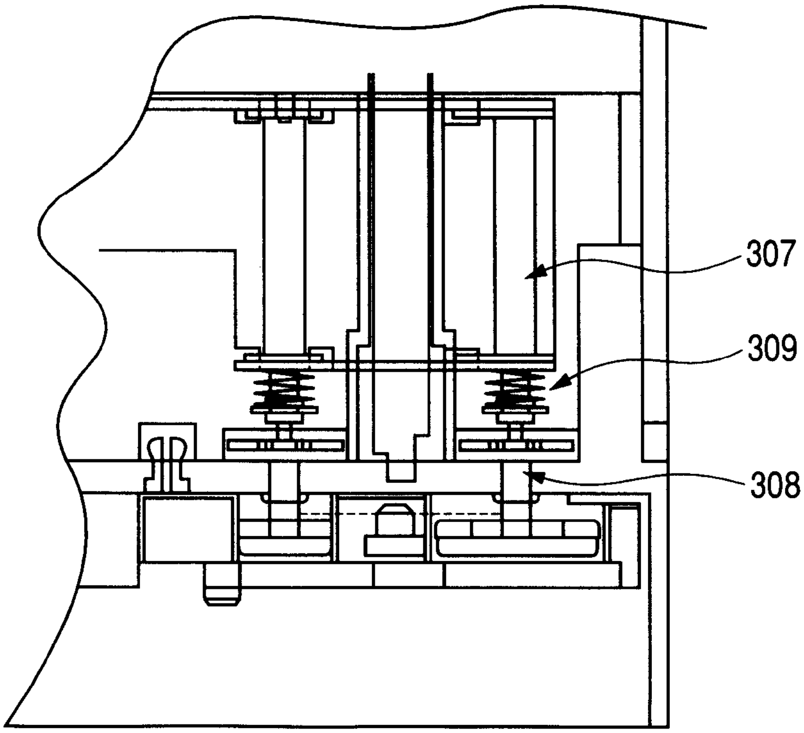
FIG. 4A is a view for explaining nonconformity of the coin pay-out mechanism.
Figure 4B:
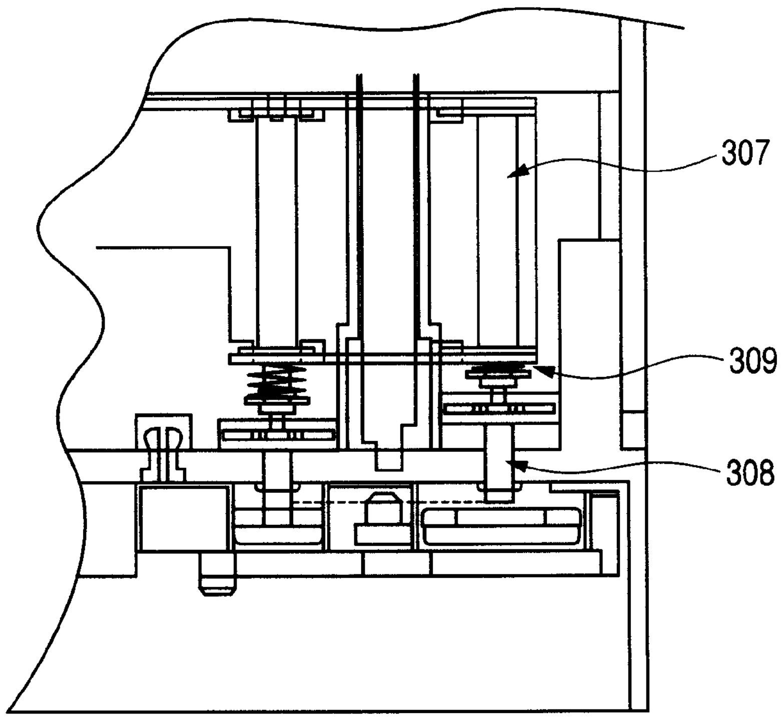
FIG. 4B is a view for explaining nonconformity of the coin pay-out mechanism.
Figure 4C:
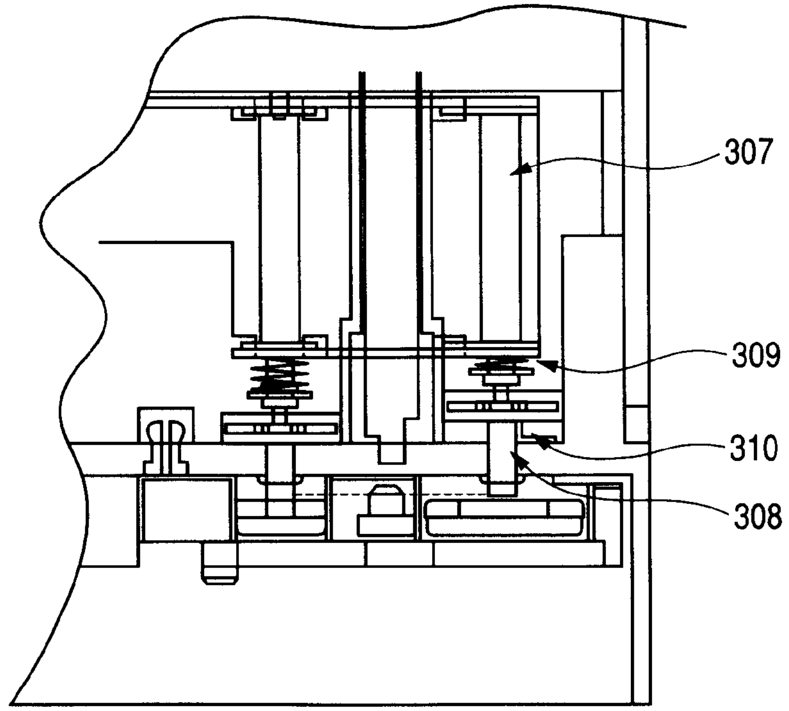
FIG. 4C is a view for explaining nonconformity of the coin pay-out mechanism.

FIG. 4 is a view for explaining the above erroneous operation. As shown in FIG. 4A, the control lever 308 is connected to the solenoid actuator 307 holding a return spring 309 between them. When the solenoid is energized, as shown in FIG. 4B, the control lever 308 compresses the return spring 309 and is elevated up. Here, as shown in FIG. 4C, if a metal fragment 310 adheres and clogs the control lever 308, despite a restoring force applied by the return spring 309, the control lever 308 will not return to the original position. Using the example explained in the above FIGS. 3A to 3C, after only the control lever 308*c* driven by the solenoid actuator 307*c* restricting the movement of the rear end of the slide member 306*c* is driven upward based on the pay-out signal to pay out only one coin stored in the hole 304*c*, the control lever 308*c* will not return to the original position and then, though only the control lever 308*b* driven by the solenoid actuator 307*b* restricting the movement of the rear end of the slide member 306*b* is driven upward based on the pay-out signal to pay out only one coin stored in the hole 304*b*, the control lever 308*c* has not returned to the original position, not only engagement between the slide member 306*b* and the control lever 308*b* but also engagement between the slide member 306*c* and the control lever 308*c* is disengaged. Therefore, not only the slide member 306*b* but also the slide member 306*c* slides rearward with the sliding motion of the pay-out link 303, downward opening of not only the hole 304*b* but also of the hole 304*c* is maintained, and not only the coins stored in the hole 304*b* but also the coins stored in the hole 304*c* are paid out.

Figure 5:
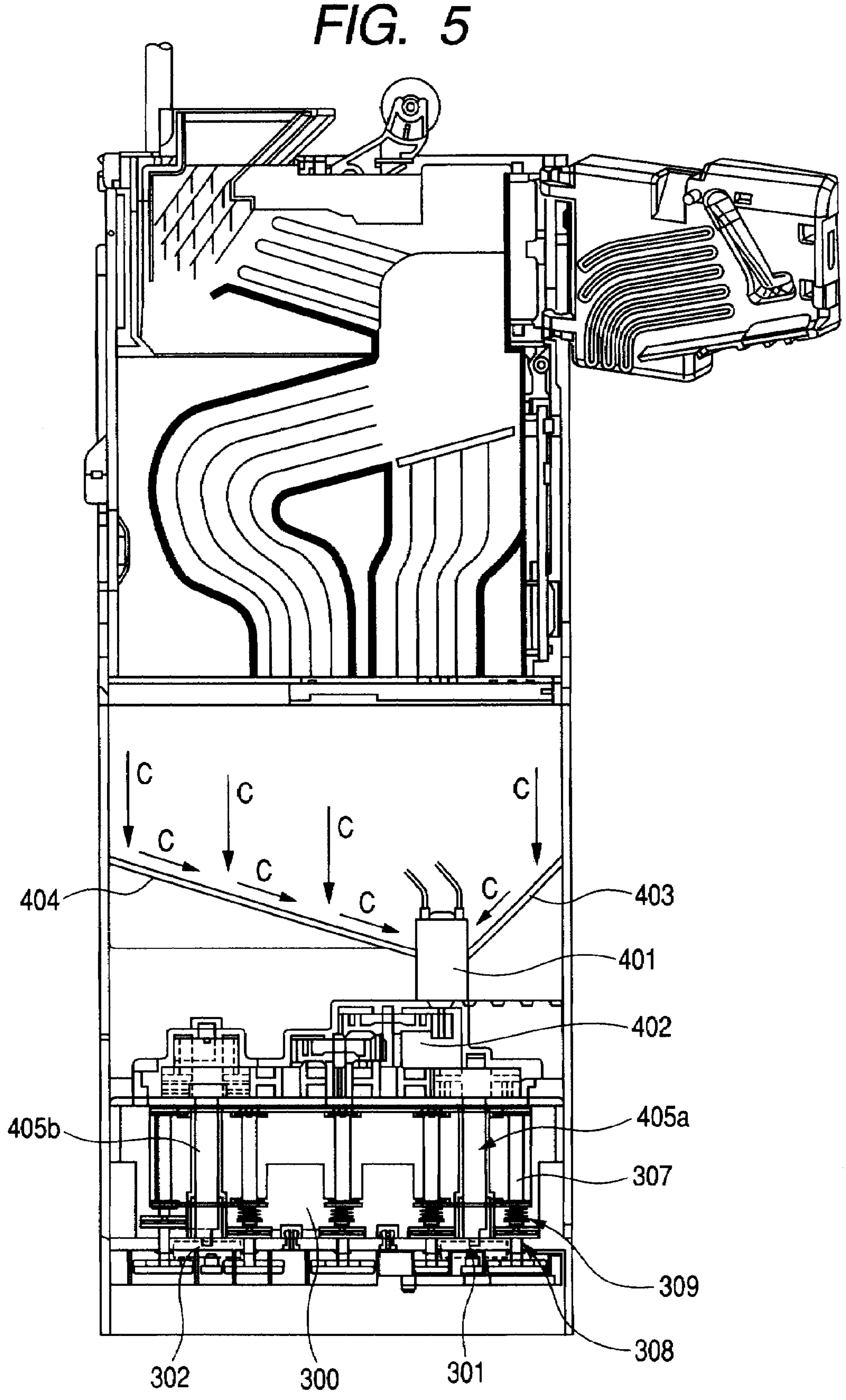
FIG. 5 is a view showing a state where coin storing means of a coin container section 102 is further removed from the apparatus for validating and paying out coins shown in FIG. 2.

The apparatus for validating and paying out coins according to the present invention can fully prevent such erroneous operation. FIG. 5 shows a state where the coin storing means of the coin storing section 102 is removed from the apparatus for validating and paying out coins shown in FIG. 2. Below the coin validating section 101 and behind the coin storing section 102, a driving motor 401, which is a direct-current motor having a magnet inside for driving the pay-out cams 301 and 302 of the coin pay-out mechanism 300 and is magnetized at driving and non-driving, and pay-out cam driving means 402 comprising gear transmitting means for transmitting a driving force of the driving motor 401 are shown. When the pay-out cam driving means 402 transmits the driving force through shafts 405*a* and 405*b*, the pay-out cams 301 and 302 are rotated once in a predetermined direction per pay-out operation. Here, attention should be paid to the positional relation between the solenoid actuator 307 and the control lever 308 as well as the driving motor 401 that the driving motor 401 is located above the solenoid actuator 307 and the control lever 308.

The solenoid actuator 307 generates a magnetic field only at driving, while the driving motor 401 is magnetized all the time. Therefore, it is possible to attract not only a ferromagnetic material such as iron but also other magnetic metals without problem.

Therefore, by providing ribs 403 and 404 for guiding fragments so as to form a slant going downward toward the driving motor 401 as shown in FIG. 5, the fragments made of a ferromagnetic material such as iron can be kept attracted to the surface of the driving motor 401. As shown in FIG. 5, the fragments having entered the apparatus for validating and paying out coins 100 are accumulated to the surface of the driving motor 401 according to the flow shown by an arrow C. Since the driving motor 401 is located above the solenoid actuator 307 and the control lever 308 as shown in FIG. 5, these fragments will not enter below the driving motor 401, but it is possible to prevent erroneous operation of the coin pay-out mechanism caused by adhesion and clogging of the fragments to the control lever 308. Also, since the fragments are collected at one spot, labor of the maintenance such as cleaning can be reduced.

The above description relates to one embodiment of the present invention, and the gist of the present invention should not be limited in interpretation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-278121, filed on Sep. 26, 2005 which is hereby incorporated by reference herein in its entirety.

What is claimed:

1. Apparatus for validating and paying out coins, comprising:

a coin inspecting section for validating coins dropped into a coin slot, a coin sorting section for guiding the dropped coins either to a current coin channel or to a fake coin channel on the basis of determination of said coin inspecting section as to whether the dropped coins are current coins or fake coins, a coin container section for receiving coins categorized in their denominations so as to store the categorized coin for each denomination, and a coin pay-out mechanism for paying out, as required, coins as change from the coins stored in said coin container section;

wherein a driving motor for driving said coin pay-out mechanism is located above said coin pay-out mechanism, one or more guidepaths is mounted at a slant so as to guide extraneous objects onto the surface of said driving motor from a range in which a magnetic field induced by a permanent magnet substantially has no effect, and said guided extraneous objects are attracted to said surface of said driving motor by magnetic field induced by the permanent magnet in said driving motor.

2. The apparatus in accordance with claim 1, wherein said driving motor for driving said coin pay-out mechanism comprises a direct-current motor having a magnet therein.

* * * * *